(12) United States Patent
Nukushina et al.

(10) Patent No.: US 12,506,752 B2
(45) Date of Patent: Dec. 23, 2025

(54) TRAFFIC SENSOR, ANALYSIS METHOD, AND ANALYSIS PROGRAM

(71) Applicant: NTT, Inc., Tokyo (JP)

(72) Inventors: Takahiro Nukushina, Musashino (JP); Yukio Nagafuchi, Musashino (JP); Makiko Aoyagi, Musashino (JP); Takaaki Koyama, Musashino (JP)

(73) Assignee: NTT, Inc., Tokyo (JP)

( * ) Notice: Subject to any disclaimer, the term of this patent is extended or adjusted under 35 U.S.C. 154(b) by 136 days.

(21) Appl. No.: 18/281,956

(22) PCT Filed: Mar. 19, 2021

(86) PCT No.: PCT/JP2021/011529
§ 371 (c)(1),
(2) Date: Sep. 14, 2023

(87) PCT Pub. No.: WO2022/195887
PCT Pub. Date: Sep. 22, 2022

(65) Prior Publication Data
US 2024/0305649 A1 Sep. 12, 2024

(51) Int. Cl.
*G06N 20/00* (2019.01)
*H04L 9/40* (2022.01)
*H04L 41/14* (2022.01)
*H04W 12/12* (2021.01)

(52) U.S. Cl.
CPC ........ *H04L 63/1416* (2013.01); *H04L 41/145* (2013.01)

(58) Field of Classification Search
None
See application file for complete search history.

(56) References Cited

U.S. PATENT DOCUMENTS 11,509,657 B2  11/2022  Tyou et al.
2020/0275278 A1*  8/2020  Hanawa ................. G06N 20/20

FOREIGN PATENT DOCUMENTS

CN  112134875 A  * 12/2020  ......... H04L 63/1425
JP  2019-213103 A  12/2019

* cited by examiner

*Primary Examiner* — Christopher B Robinson
(74) *Attorney, Agent, or Firm* — XSENSUS LLP

(57) ABSTRACT

A traffic sensor includes processing circuitry configured to calculate a degree of spread of a range of normal communication indicated by a normal communication model for each of the normal communication model for detecting abnormal communication of an Internet of Things (IoT) device learned for each of the IoT device to be monitored, classify a normal communication model in which the degree of spread is less than a predetermined value as a normal communication model of an IoT device of a first model, and classify a normal communication model in which the degree of spread is equal to or greater than the predetermined value as a normal communication model of an IoT device of a second model, detect abnormal communication in the IoT device by using the normal communication model of the IoT device of the first model, and extract a feature amount.

9 Claims, 10 Drawing Sheets

Fig. 9

| IoT DEVICE | FEATURE AMOUNT IS NOT EXTRACTED | | FEATURE AMOUNT IS EXTRACTED | |
|---|---|---|---|---|
| | FalsePositive | TruePositive | FalsePositive | TruePositive |
| esensor | 3 | 4 | 0 | 4 |
| eremote | 5 | 4 | 0 | 4 |
| firetv | 16 | 4 | 11 | 4 |
| netatmowelcome | 2 | 4 | 0 | 4 |
| netatmoweather | 7 | 4 | 0 | 4 |
| netatmopresence | 11 | 4 | 0 | 4 |
| switch | 7 | 4 | 0 | 4 |
| psvita | 3 | 4 | 1 | 4 |
| ps4 | 6 | 4 | 1 | 4 |
| xbox | 6 | 4 | 4 | 4 |
| roomba | 9 | 4 | 4 | 4 |
| hdl | 9 | 4 | 0 | 4 |
| ls | 15 | 4 | 1 | 4 |
| galaxy | 4 | 4 | 0 | 4 |
| aquos | 3 | 4 | 3 | 4 |

STABLE MODEL: { esensor, eremote }

TRAFFIC SENSOR, ANALYSIS METHOD, AND ANALYSIS PROGRAM

CROSS-REFERENCE TO RELATED APPLICATION

The present application is based on PCT filing PCT/JP2021/011529, filed Mar. 19, 2021, the entire contents of which are incorporated herein by reference.

TECHNICAL FIELD

The present invention relates to a traffic sensor, an analysis method, and an analysis program.

BACKGROUND ART

It is known that Internet of Things (IoT) devices often communicate only in a specific communication pattern. Therefore, a traffic sensor (hereinafter, appropriately abbreviated as a sensor) that monitors communication of an IoT device analyzes communication data of the IoT device to be monitored, obtains statistics of feature amounts such as the number of transmission packets and the number of destination IP addresses, and learns a normal communication model of the IoT device. Then, when detecting an abnormal behavior caused by malware infection or the like of the IoT device using the learned normal communication model, the sensor performs communication interruption or the like.

When the sensor learns the above-described normal communication model of the IoT device, the learning of the normal communication model is completed at a time point when it can be determined that the communication behavior of the IoT device is stable. Then, the sensor uses the learned normal communication model for communication abnormality detection (see Patent Literature 1).

CITATION LIST

Patent Literature

Patent Literature 1: Japanese Laid-open Patent Publication No. 2019-213103 A

SUMMARY OF INVENTION

Technical Problem

However, conventional technologies have the following problems.
(1) Similar Abnormal Communication Occurring in a Plurality of IoT Devices Due to Malware Infection or the Like Cannot be Recognized In a conventional technology, a sensor learns a normal communication model in units of target IoT devices, and uses the learned normal communication model for abnormality detection of communication of the IoT device. According to this technology, it is possible to detect an abnormality in communication of a single IoT device, but for example, the similarity and correlation of abnormal communication occurring in a plurality of IoT devices due to the spread of malware infection in the network (NW) are unknown. As a result, there is a problem that recognition of a serious incident occurring in the entire NW may be delayed. In solving such a problem, there are the following problems.

(2) Overdetection of IoT Devices of Unstable Models is Frequent, and Thus an Important Alert Cannot be Recognized In learning of a normal communication model of each IoT device in a conventional technology, a tendency of communication at a normal time varies depending on the IoT device. Therefore, the nature of the normal communication model generated by the sensor also differs for each IoT device. Here, with respect to an IoT device of a model having few communication pattern in a normal state, the sensor easily learns an appropriate normal communication model and threshold. As a result, the sensor can remarkably detect abnormal communication due to malware infection or the like of the IoT device of the model.

On the other hand, for an IoT device of a model having many communication patterns in the normal state, it is difficult for the sensor to observe all the normal communication patterns during the learning period of the normal communication model. Therefore, there is a high possibility that the sensor observes unknown normal communication after generation of the normal communication model. As a result, there is a high possibility that the sensor overdetects abnormal communication of the IoT device of the model.

As a countermeasure against the above problem, an improvement method such as securing a long learning time of a normal communication model for an IoT device of a model having many communication patterns at the normal time can be considered. However, when the sensor secures a long learning time of the normal communication model, problems such as a high risk of learning the behavior of unauthorized communication of the IoT device and an increase in machine load associated with learning processing remain.

Due to the above problem, it has been difficult to analyze the similarity and correlation of abnormal communication occurring in a plurality of IoT devices in the NW. Therefore, it is difficult to detect abnormal communication common to a plurality of IoT devices in the NW.

Therefore, an object of the present invention is to solve the above-described problem and facilitate detection of abnormal communication common to a plurality of IoT devices.

Solution to Problem

In order to solve the above problem, a traffic sensor includes: processing circuitry configured to: calculate a degree of spread of a range of normal communication indicated by a normal communication model for each of the normal communication model for detecting abnormal communication of an Internet of Things (IoT) device learned for each of the IoT device to be monitored; classify a normal communication model in which the degree of spread is less than a predetermined value as a normal communication model of an IoT device of a first model, and classify a normal communication model in which the degree of spread is equal to or greater than the predetermined value as a normal communication model of an IoT device of a second model; detect abnormal communication in the IoT device by using the normal communication model of the IoT device of the first model; extract a feature amount in which a contribution degree to detection of the abnormal communication is equal to or greater than a predetermined value among feature amounts used in the normal communication model of the IoT device of the first model; reconstruct the normal communication model of the IoT device of the second model using the feature amount that has been extracted; and analyze abnormal communication common to each of IoT devices by using abnormal communication of the IoT device of the first model detected using the normal communication model and abnormal communication of the IoT device of the second model detected using the normal communication model that has been reconstructed.

Advantageous Effects of Invention

According to the present invention, it is possible to facilitate detection of abnormal communication common to a plurality of IoT devices.

BRIEF DESCRIPTION OF DRAWINGS

FIG. 9 is a diagram illustrating an experimental result of the sensor.

DESCRIPTION OF EMBODIMENTS

Hereinafter, modes for carrying out the present invention (embodiments) will be described with reference to the drawings. The present invention is not limited to the embodiments described below.

Figure 1:
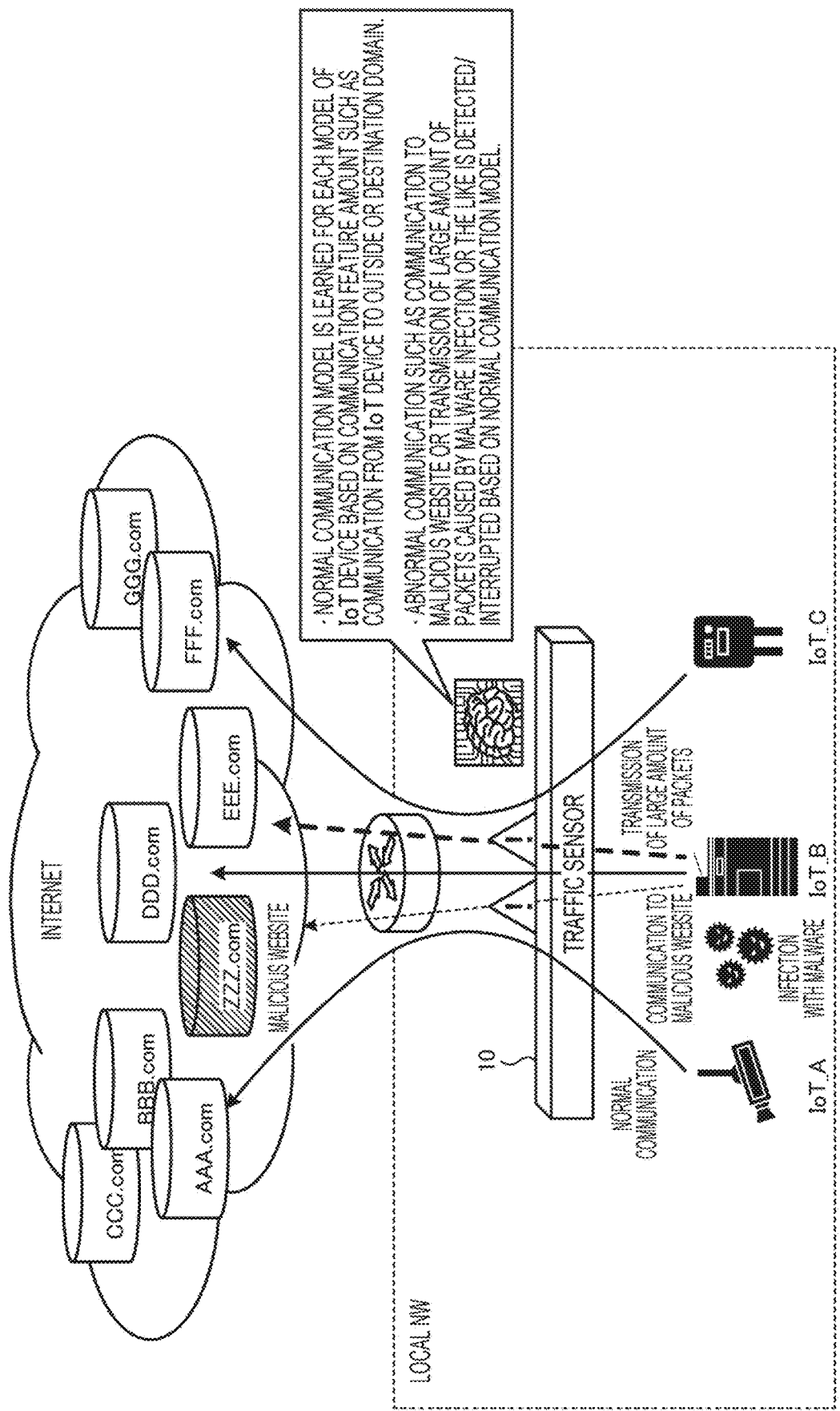
FIG. 1 is a diagram illustrating an overview of a traffic sensor (sensor).

[Overview] First, an overview of a traffic sensor (sensor) of the present embodiment will be described with reference to FIG. 1. A sensor 10 relays communication from each IoT device to the outside (for example, the Internet illustrated in FIG. 1). Here, the sensor 10 learns a normal communication model of an IoT device on the basis of a feature amount of a destination domain or the like in communication of the IoT device. For example, the sensor 10 learns the normal communication models of IoT_A, IoT_B, and IoT_C on the basis of the feature amount of communication of each of IoT_A, IoT_B, and IoT_C.

The sensor 10 monitors the communication of each IoT device on the basis of the normal communication model for each IoT device, and detects/interrupts, for example, abnormal communication such as communication to a malicious site or transmission of a large amount of packets caused by malware infection or the like.

Figure 2:
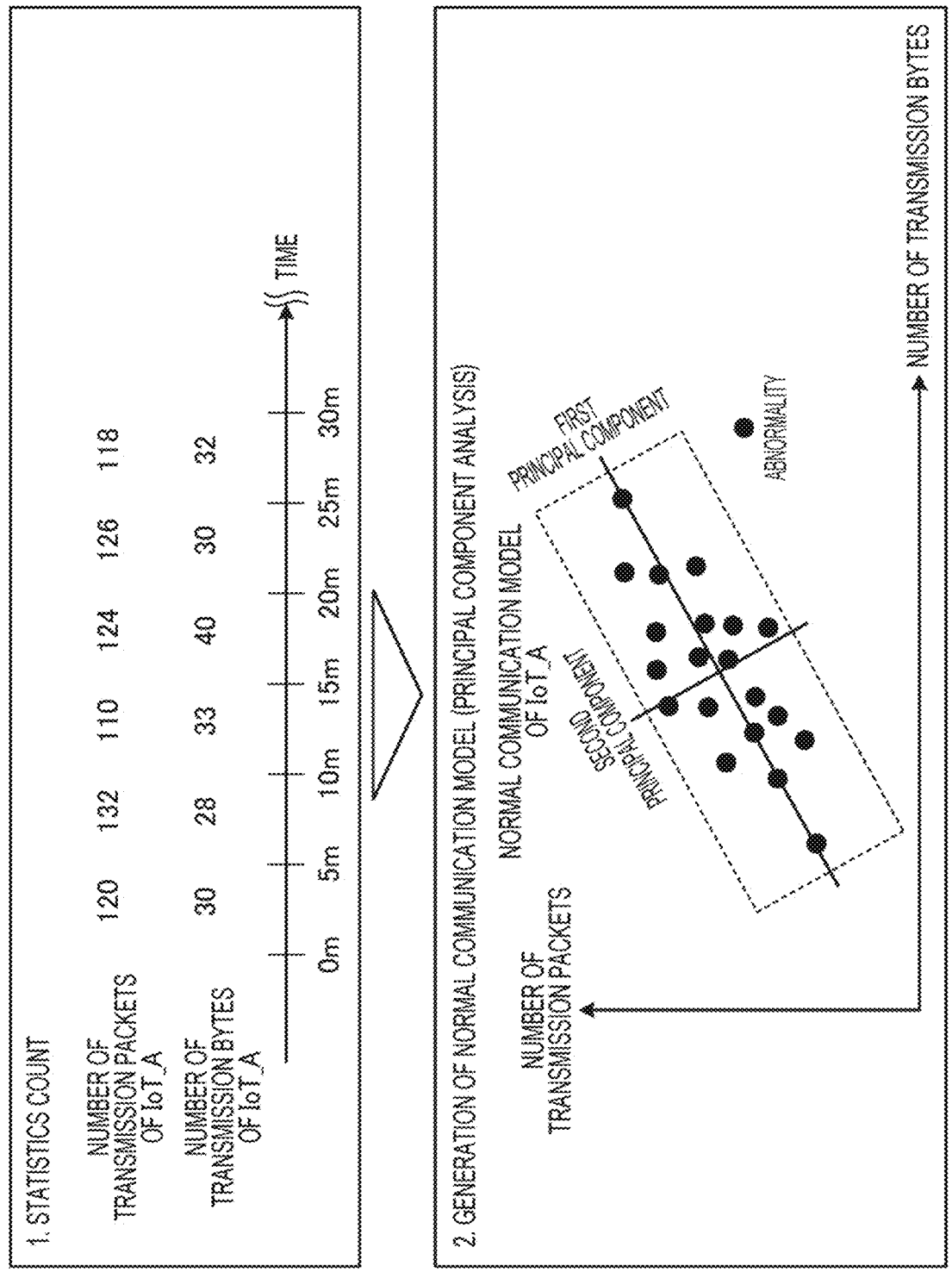
FIG. 2 is a diagram illustrating an example of a normal communication model.

[Normal Communication Model] Here, a normal communication model of the IoT device learned by the sensor 10 will be described with reference to FIG. 2. The sensor 10 learns a normal communication model of the IoT device by estimating a probability distribution of each feature amount included in communication of the IoT device using, for example, principal component analysis or the like. Then, the sensor 10 sets a threshold to the normal communication model, and detects communication based on a feature amount exceeding the threshold as abnormal communication.

For example, first, the sensor 10 counts a statistic per unit time for each feature amount of communication of the IoT device. For example, the sensor 10 counts the number of transmission packets and the number of transmission bytes per unit time of IoT_A (1. Counting of statistics).

Then, the sensor 10 plots the value counted in 1. in a space having each of the above feature amounts as an axis, and determines the range of normal communication on an axis in a direction in which the variance is large (the first principal component and the second principal component obtained by the principal component analysis). For example, the sensor 10 determines a range surrounded by a broken line in FIG. 2 as a normal communication range of IoT_A. Then, the sensor 10 detects a value deviating from the range of the normal communication as abnormal communication (2. Generation of normal communication model (principal component analysis)).

Figure 3:
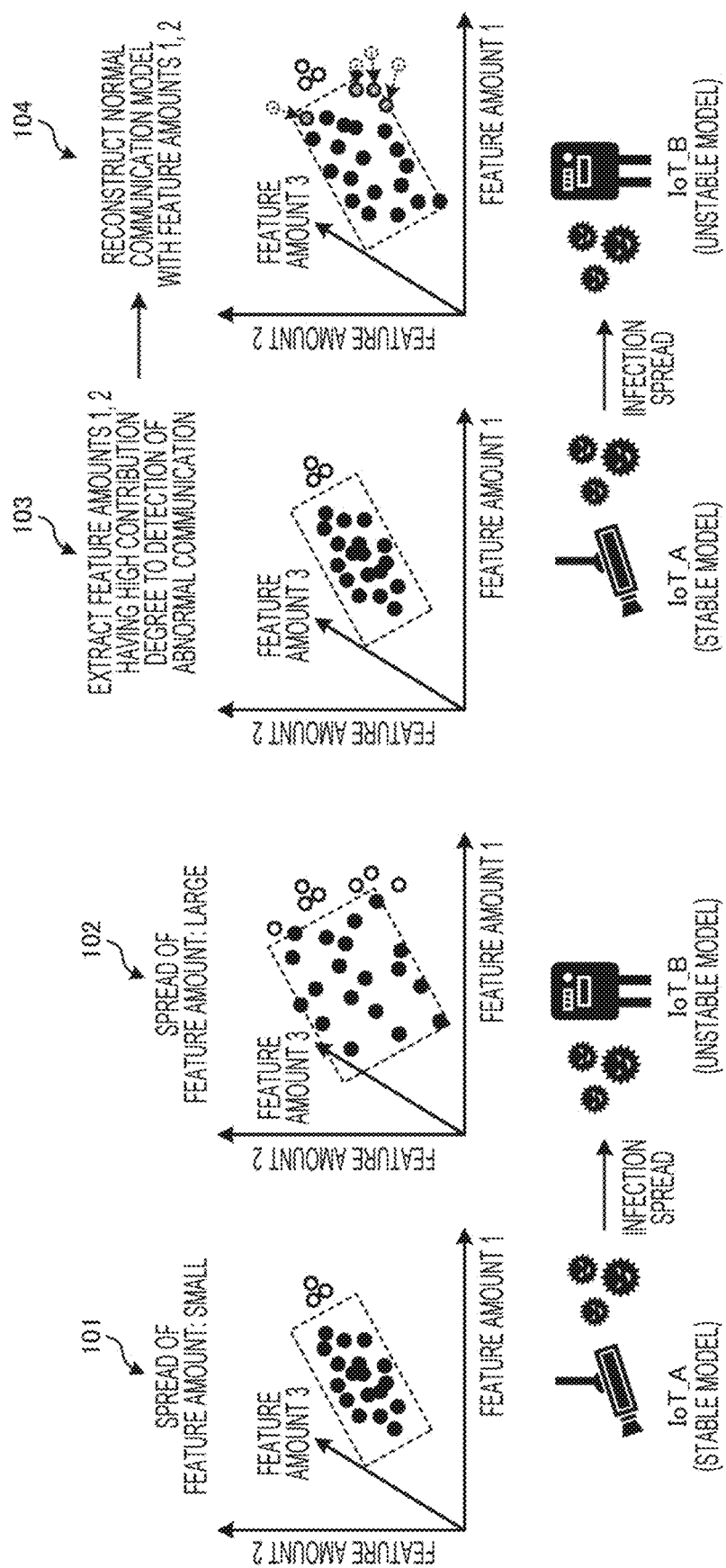
FIG. 3 is a diagram illustrating an example of extraction of an effective extraction amount.

[Extraction of Effective Feature Amount] The IoT device includes a model with few communication patterns in the normal state (stable model) and a model with many communication patterns in the normal state (unstable model). Here, for example, a case where IoT_A is a stable model and IoT_B is an unstable model among IoT_A and IoT_B illustrated in FIG. 3 will be considered. In this case, the range of the normal communication (the spread of the feature amount) in the normal communication model of IoT_B is larger than the range of the normal communication (the spread of the feature amount) in the normal communication model of IoT_A (see reference numerals 101, 102).

Therefore, when the sensor 10 detects abnormal communication using the normal communication model of IoT_B, overdetection is likely to occur in various feature amount directions. As a result, the sensor 10 has difficulty in finding common abnormal communication occurring in a plurality of IoT devices due to the spread of malware infection in the NW.

Therefore, for example, the sensor 10 extracts the feature amounts 1 and 2 having a high contribution degree to detection of abnormal communication among the feature amounts 1, 2, and 3 used in the normal communication model of IoT_A as effective feature amounts (see reference numeral 103).

Then, the sensor 10 reconstructs the normal communication model of IoT_B using the extracted effective feature amounts (feature amounts 1 and 2) (see reference numeral 104). As a result, the sensor 10 can suppress the spread of the range of the normal communication in the normal communication model of IoT_B in an unnecessary feature amount direction. As a result, the sensor 10 can easily find common abnormal communication (for example, communication indicated by a circle in reference numerals 103, 104) occurring in a plurality of IoT devices.

Figure 4:
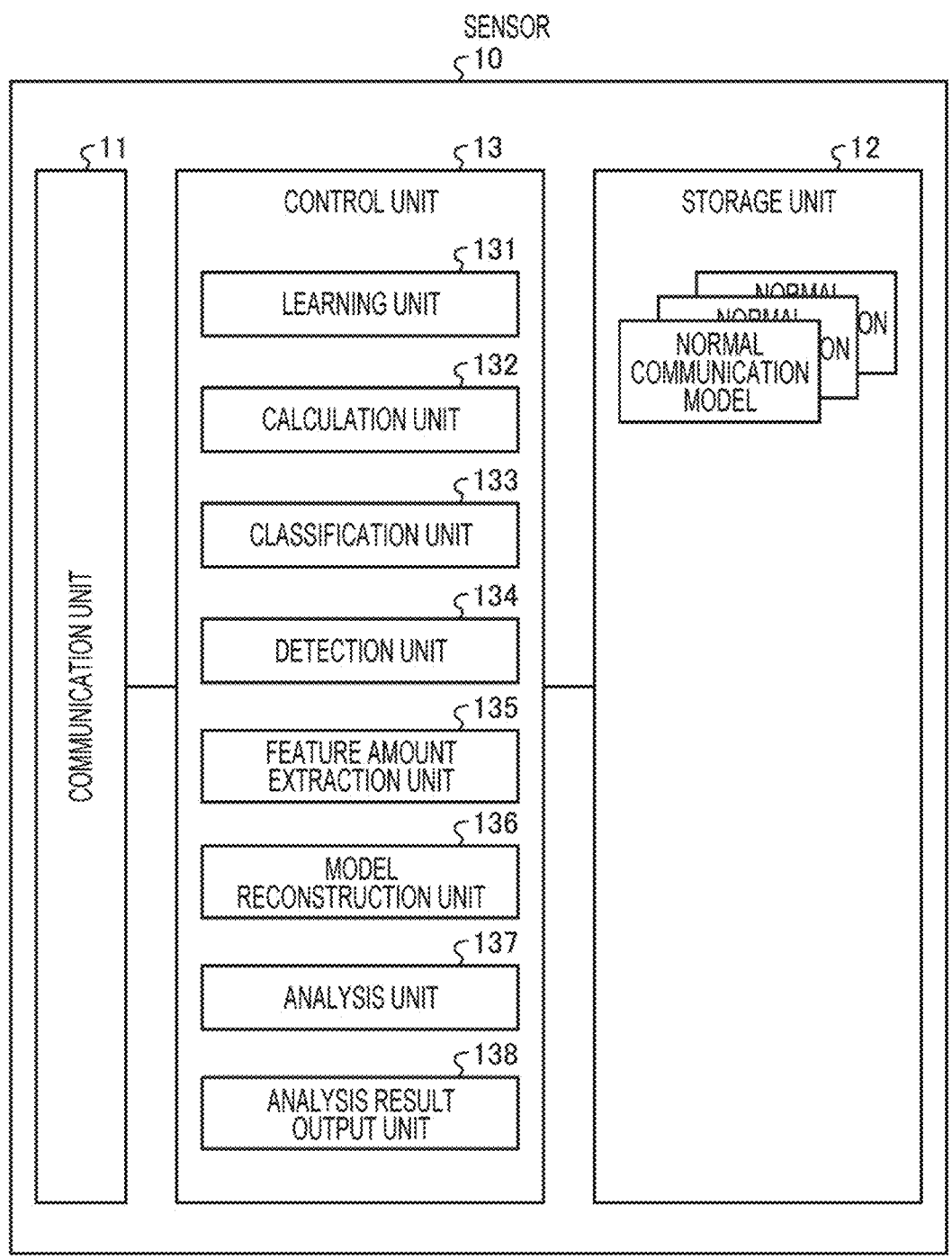
FIG. 4 illustrates a configuration example of a sensor.

[Configuration Example of Sensor] Next, a configuration example of the sensor 10 will be described with reference to FIG. 4. The sensor 10 includes a communication unit 11, a storage unit 12, and a control unit 13. The communication unit 11 is an interface for performing communication with an external device (for example, an IoT device) via a network.

The storage unit 12 stores data to be referred to when the control unit 13 executes various kinds of processing and data generated by the control unit 13. For example, the storage unit 12 stores the normal communication model for each IoT device generated by the control unit 13.

The control unit 13 includes a learning unit 131, a calculation unit 132, a classification unit 133, a detection unit 134, a feature amount extraction unit 135, a model reconstruction unit 136, an analysis unit 137, and an analysis result output unit 138.

The learning unit 131 learns (constructs) the normal communication model of the IoT device on the basis of the feature amount of the communication data of the IoT device to be monitored acquired via the communication unit 11. The feature amount is, for example, the number of transmission packets per unit time, the IP address of the communication destination, the port number, the number of bytes of the packet, or the like. The learned normal communication model is stored in the storage unit 12.

The calculation unit 132 calculates a degree of spread of a range of normal communication in the normal communication model. For example, the calculation unit 132 calculates the degree of spread of the range of the normal communication in the normal communication model by the product of the variances in the feature amount directions used for the normal communication model.

The classification unit 133 classifies, as a normal communication model of an IoT device of a stable model, a normal communication model in which a degree of spread (for example, the product of the variances in the feature amount directions) of a range of normal communication is less than a predetermined value in the normal communication model, the degree of spread being calculated by the calculation unit 132, and classifies, as a normal communication model of an IoT device of an unstable model, a normal communication model of an IoT device in which the degree of spread of the range of normal communication is equal to or greater than a predetermined value.

The detection unit 134 detects abnormal communication in the IoT device by using the normal communication model for each IoT device.

The feature amount extraction unit 135 extracts, as an effective feature amount, a feature amount in which a contribution degree to detection of abnormal communication is equal to or greater than a predetermined value among feature amounts used in a normal communication model of an IoT device of a stable model. For example, when the feature amount extraction unit 135 receives a detection result of abnormal communication of an IoT device of a stable model from the detection unit 134, the feature amount extraction unit 135 extracts, as the effective feature amount, a feature amount in which a contribution degree to the detection of the abnormal communication is equal to or greater than a predetermined value among the feature amounts used for the normal communication model of the IoT device.

The model reconstruction unit 136 reconstructs a normal communication model of an IoT device of an unstable model using the effective feature amount extracted by the feature amount extraction unit 135. When the normal communication model of the IoT device of the unstable model is reconstructed by the model reconstruction unit 136, the detection unit 134 detects abnormal communication in the IoT device of the unstable model using the reconstructed normal communication model of the IoT device of the unstable model.

The analysis unit 137 analyzes a tendency of abnormal communication common to each IoT device by using abnormal communication detected by the IoT device of the stable model using the normal communication model and abnormal communication detected by the IoT device of the unstable model using the reconstructed normal communication model. For example, the analysis unit 137 extracts abnormal communication having similarity equal to or greater than a predetermined value among pieces of abnormal communication detected in each IoT device.

The analysis result output unit 138 outputs an analysis result by the analysis unit 137. For example, the analysis result output unit 138 outputs, as an important alert, content of abnormal communication having a similarity equal to or greater than predetermined value among abnormal communication detected by each IoT device extracted by the analysis unit 137.

According to such a sensor 10, it is possible to easily detect abnormal communication common to a plurality of IoT devices.

Figure 5:
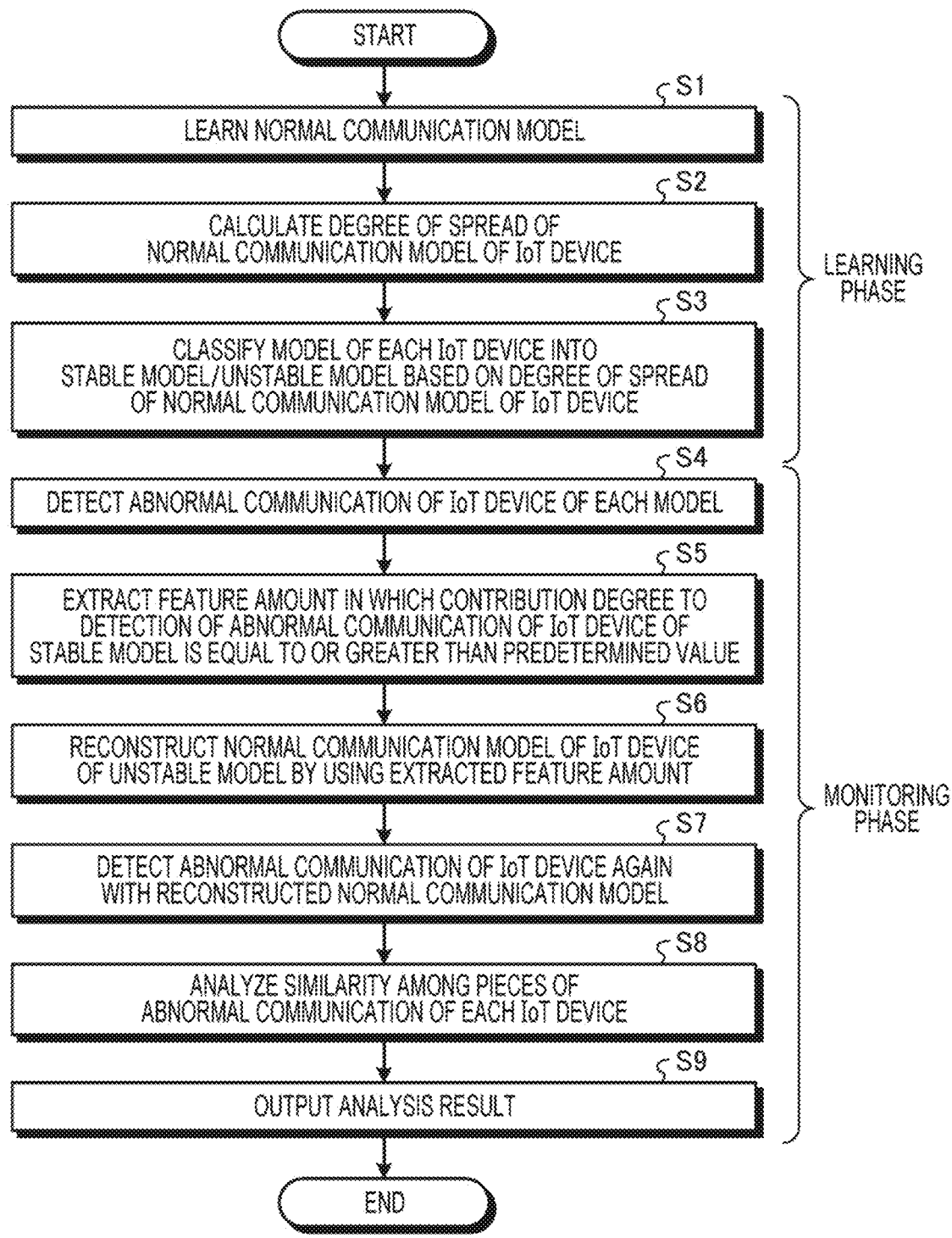
FIG. 5 is a flowchart illustrating an example of a processing procedure of the sensor.

[Example of Processing Procedure] Next, an example of a processing procedure of the sensor 10 will be described with reference to FIG. 5. Here, a case where the sensor 10 observes communication of a new IoT device will be described as an example. The processing performed by the sensor 10 is divided into a learning phase and a monitoring phase. First, the learning phase will be described.

[Learning Phase] When the sensor 10 observes communication of a new IoT device, the learning unit 131 of the sensor 10 learns a normal communication model of the IoT device (S1). Thereafter, the calculation unit 132 calculates the degree of spread of the range of the normal communication indicated by the normal communication model of the IoT device (S2: calculating the degree of spread of the normal communication model of the IoT device). Next, the classification unit 133 classifies the model of the IoT device as a stable model/unstable model on the basis of the degree of spread of the normal communication model calculated in S2 (S3).

[Monitoring Phase] After S3, the detection unit 134 detects abnormal communication of the IoT device of each model (S4). Then the feature amount extraction unit 135 extracts a feature amount (effective feature amount) in which a contribution degree to detection of abnormal communication is equal to or greater than a predetermined value of an IoT device of a stable model (S5). That is, when the feature amount extraction unit 135 uses a detection result of abnormal communication of an IoT device of a stable model among detection results in S4 to extract a feature amount in which a contribution degree to the detection of the abnormal communication is equal to or greater than a predetermined value from the normal communication model of the IoT_A.

After S5, the model reconstruction unit 136 reconstructs a normal communication model of an IoT device of an unstable model using the feature amount extracted in S5 (S6). Then, the detection unit 134 detects the abnormal communication of the IoT device again with the reconstructed normal communication model (S7).

After S7, the analysis unit 137 analyzes the similarity of the abnormal communication of each IoT device (S8). For example, the analysis result output unit 138 outputs the analysis result in SB (S9).

Figure 6:
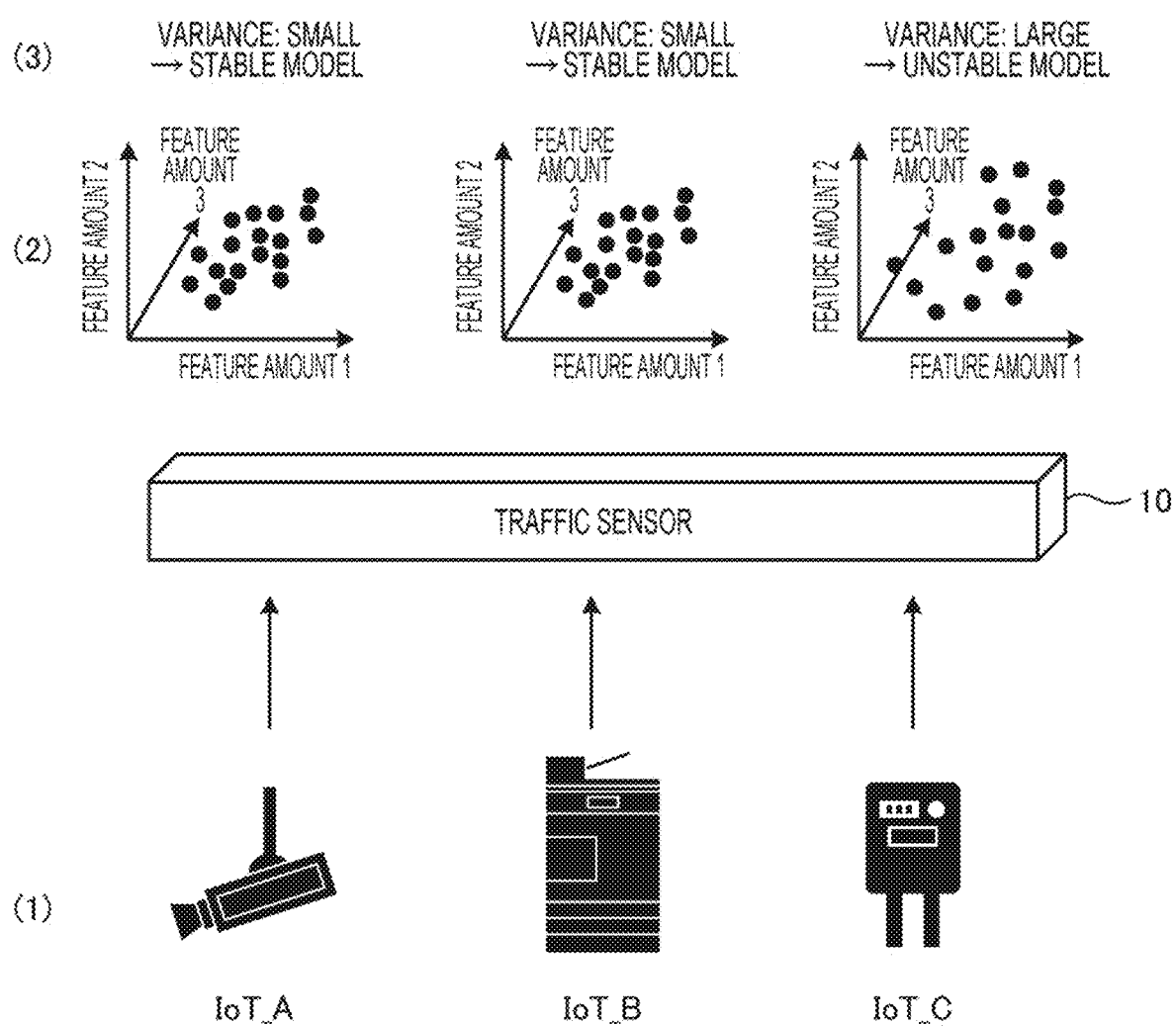
FIG. 6 is a diagram illustrating an example of a processing procedure of the sensor in a learning phase.
Figure 7:
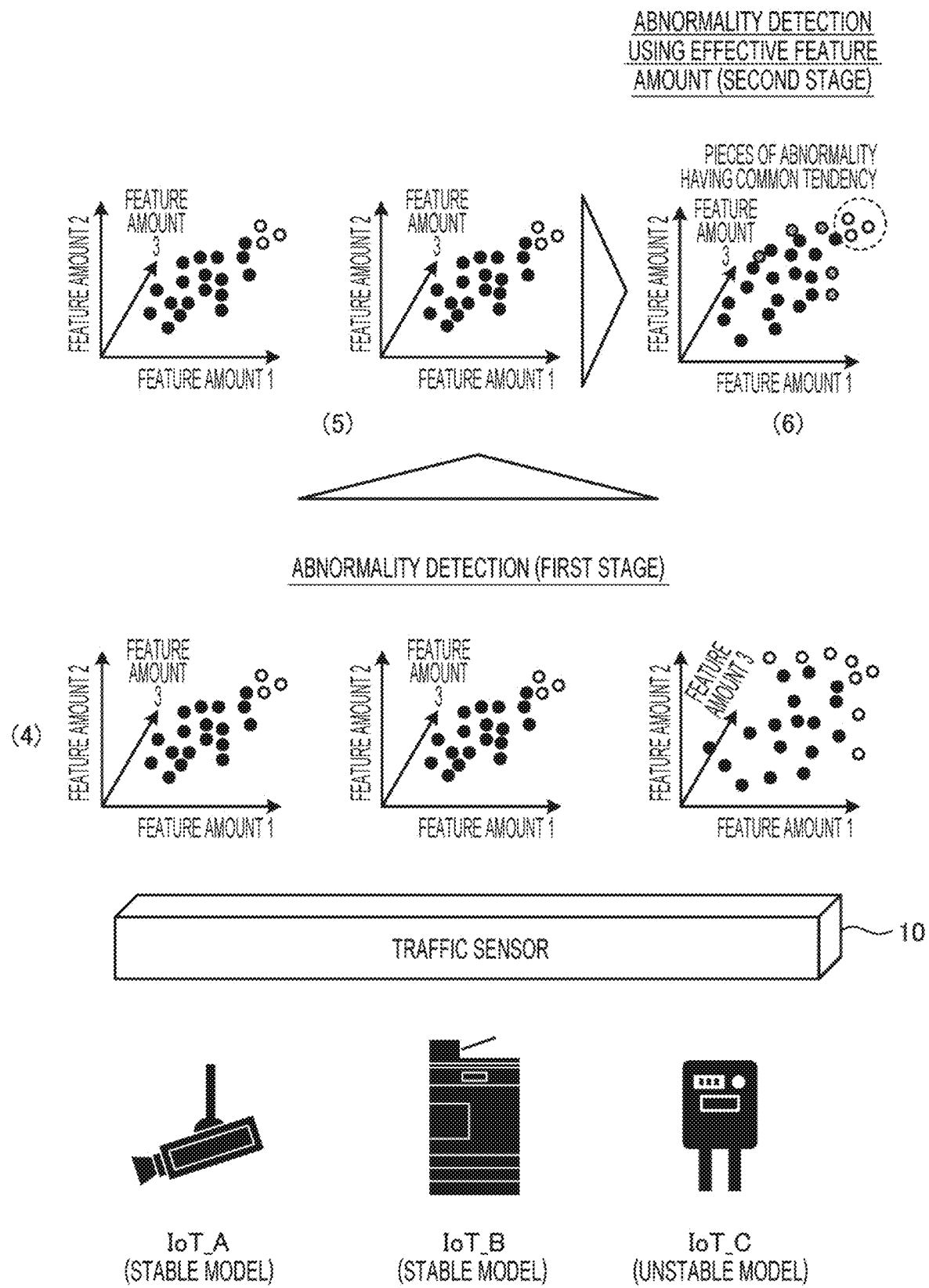
FIG. 7 is a diagram illustrating an example of a processing procedure of the sensor in a monitoring phase.

An example of a processing procedure of the sensor 10 will be described with reference to FIGS. 6 and 7. For example, as illustrated in FIG. 6, when the sensor 10 observes communication of a new IoT device (IoT_A, IoT_B, IoT_C) ((1)), the learning unit 131 learns a normal communication model on the basis of the feature amount of communication of each of IoT_A, IoT_B, and IoT_C ((2)).

Thereafter, the calculation unit 132 calculates the degree of spread of the range of the normal communication in the normal communication model of each of IoT_A, IoT_B, and IoT_C by the product of the variances in the feature amount directions of the normal communication model. Then, the classification unit 133 classifies IoT_A, IoT_B, and IoT_C into stable models and unstable models on the basis of the product of the calculated variances in the feature amount directions ((3)). For example, the classification unit 133 classifies IoT_A and IoT_B in which the value of the product of the variances is smaller than a predetermined value as stable models, and classifies IoT_C in which the value of the product of the variances is larger than a predetermined value as an unstable model.

Now, FIG. 7 will be described. The detection unit 134 detects abnormal communication using each normal communication model for IoT_A, IoT_B, and IoT_C ((4) Abnormality detection (first stage)). Then, the feature amount extraction unit 135 extracts, as an effective feature amount, a feature amount in which a contribution degree to detection of abnormal communication of IoT_A and IoT_B, which are stable models, is a predetermined value or more ((5)). For example, the feature amount extraction unit 135 extracts the feature amounts 1 and 2 illustrated in FIG. 7 as effective feature amounts.

Thereafter, the model reconstruction unit 136 reconstructs the normal communication model of IoT_C, which is an unstable model, using the effective feature amount. Then, the detection unit 134 detects the abnormal communication of IoT_C again using the reconstructed normal communication model ((6) Abnormality detection using effective feature amount (second stage)). Then, the analysis unit 137 analyzes the similarity of the abnormal communication of IoT_A, IoT_B, and IoT_C. For example, the analysis unit 137 finds an abnormality having a common tendency among IoT_A, IoT_B, and IoT_C. Then, the analysis result output unit 138 outputs an abnormality having a tendency common to IoT_A, IoT_B, and IoT_C as an important alert.

According to such a sensor 10, it is possible to detect abnormal communication common to a plurality of IoT devices.

[Experimental Results] An experimental result of the sensor 10 will be described with reference to FIG. 8. Here, it was confirmed whether or not the abnormal communication can be correctly detected by reconstructing a normal communication model of an IoT device of an unstable model using data mixed with an attack by port scan in a NW.

Figure 8:
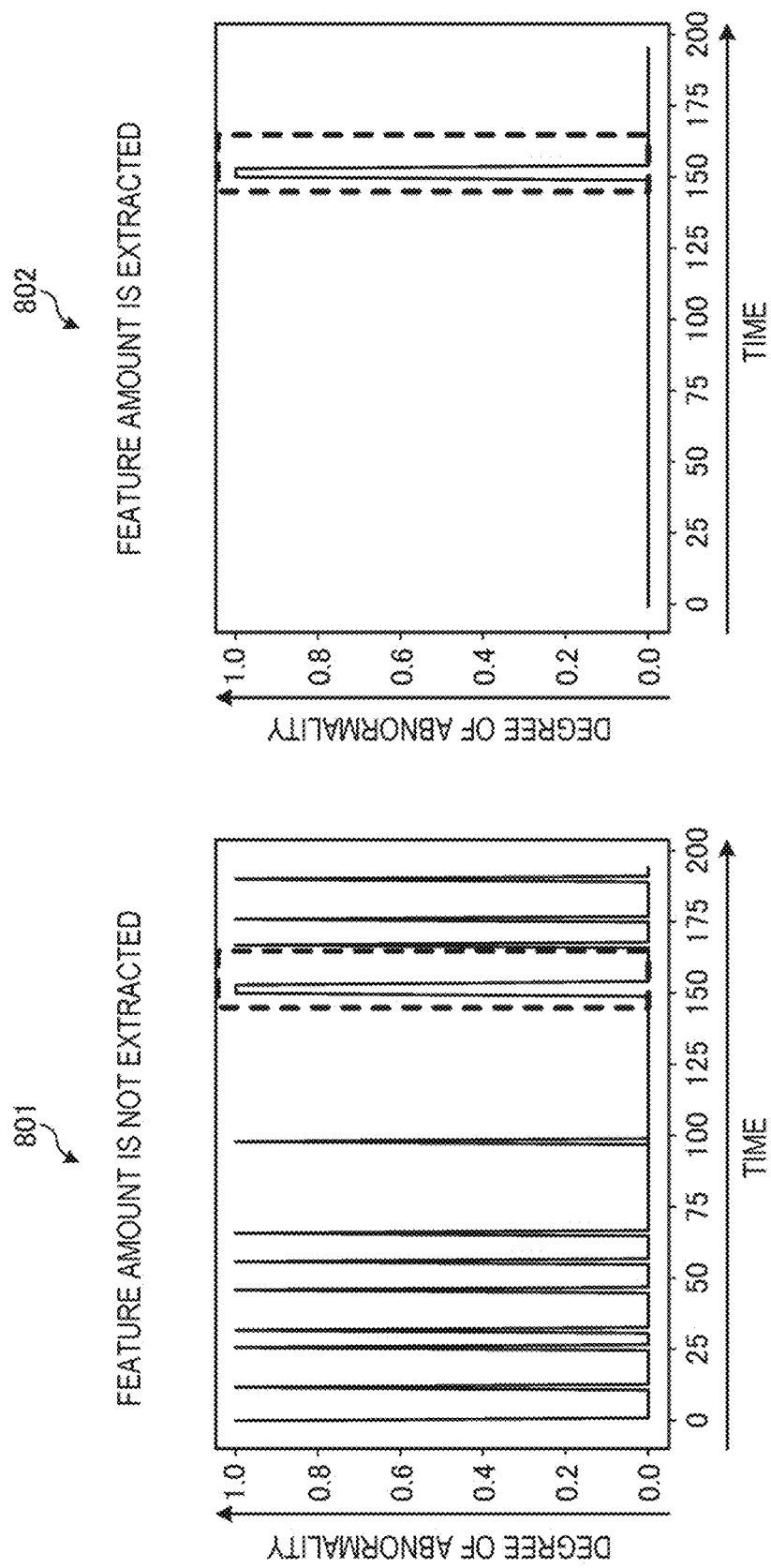
FIG. 8 is a graph illustrating an experimental result of the sensor.

The attack data by the port scan was mixed in the time zone indicated by the broken line in FIG. 8. The sensor 10 extracted 30% of the feature amount among the feature amounts used for the normal communication model of the IoT device of the stable model as the effective feature amount, reconstructed the normal communication model of the IoT device of the unstable model using the extracted effective feature amount, and detected the abnormal communication. In the graph indicated by the reference numerals 801, 802 in FIG. 8, the horizontal axis represents time, and the vertical axis represents the degree of abnormality of communication detected using the normal communication model at each time.

A graph (feature amount is not extracted) indicated by reference numeral 801 in FIG. 8 illustrates an experimental result in a case where the sensor 10 detected abnormal communication without reconstructing the normal communication model. A graph (feature amount is extracted) indicated by reference numeral 802 indicates an experimental result in a case where the sensor 10 reconstructed a normal communication model and then detected abnormal communication. In the graph indicated by reference numeral 801, a time zone having a high degree of abnormality other than the time zone indicated by the broken line can be considered as a time zone in which the sensor 10 performs overdetection of abnormal communication.

As indicated by reference numeral 801, 802 in FIG. 8, it has been confirmed that the overdetection of the abnormal communication can be reduced by about 85% when the normal communication model of the IoT device of the unstable model is reconstructed, as compared with the case where the normal communication model is not reconstructed. As a result, it has been confirmed that the sensor 10 is easy to extract the important alert common to the plurality of IoT devices.

An experimental result of the sensor 10 will be further described with reference to FIG. 9. Here, an experiment was performed on 2 IoT devices of a stable model and 13 IoT devices of an unstable model in the NW using data obtained by mixing 4 pieces of abnormality data. The experiment time was 200 hours as in the experiment described in FIG. 8.

As illustrated in FIG. 9, the sensor 10 detects abnormal communication between a case where the normal communication model was not reconstructed (=case where the feature amount extraction was not performed) and a case where the normal communication model was reconstructed (=case where the feature amount extraction was performed) for each of the 2 IoT devices of the stable model and the 13 IoT devices of the unstable model. In FIG. 9, False Positive indicates overdetection of abnormal communication, and True Positive indicates correct detection of abnormal communication.

As illustrated in FIG. 9, it has been confirmed that the overdetection of the abnormal communication can be reduced by about 80% on average for each IoT device as compared with the case where the sensor 10 reconstructs the normal communication model (=case where the feature amount is extracted) and the case where the sensor does not reconstruct the normal communication model (=case where the feature amount is not extracted).

[System Configuration and Others] Each component of each unit illustrated in the drawings is functionally conceptual and does not necessarily need to be physically configured as illustrated in the drawings. That is, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program executed by the CPU or can be implemented as hardware by wired logic.

In the processing described in the above embodiment, all or part of processing described as being automatically performed may be manually performed, or all or part of processing described as being manually performed may be automatically performed by a known method. In addition, the processing procedures, the control procedures, the specific names, and the information including various types of data and parameters illustrated in the above document and the drawings can be freely changed unless otherwise specified.

[Program] The sensor 10 can be implemented by installing a program in a desired computer as packaged software or online software. It is possible to cause, for example, an information processing device to execute the program, thereby causing the information processing device to function as the sensor 10. The information processing device mentioned here includes a desktop or a laptop personal computer. In addition, the information processing device also includes mobile communication terminals such as a smartphone, a mobile phone, and a personal handy-phone system (PHS) and terminals such as a personal digital assistant (PDA).

In a case where a terminal device used by a user is implemented as a client, the sensor 10 can be implemented as a server device that provides a service regarding the above processing for the client. In this case, the server device may be implemented as a web server or may be implemented as a cloud that provides a service regarding the above processing by outsourcing.

Figure 10:
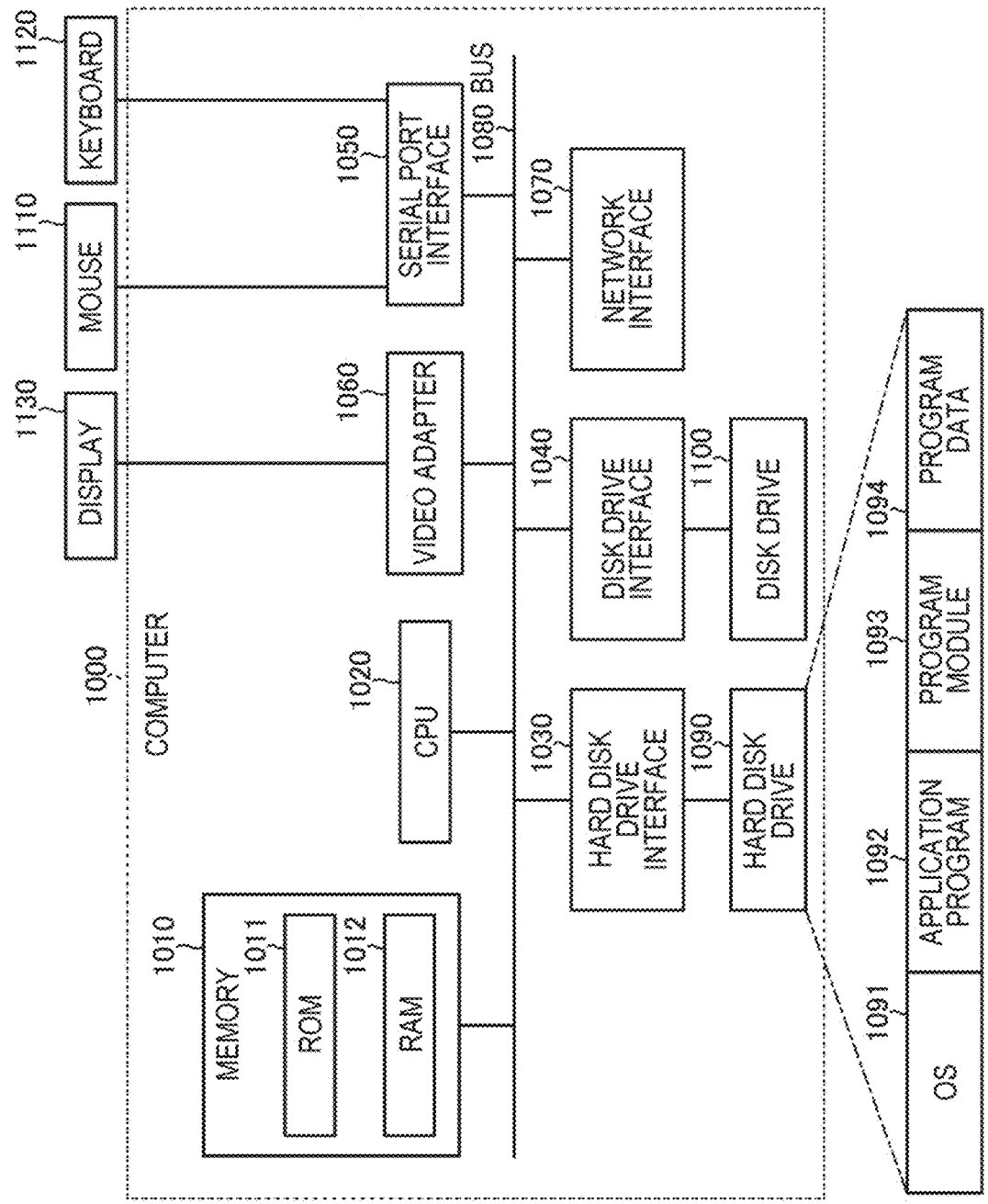
FIG. 10 illustrates a configuration example of a computer that executes an analysis program.

FIG. 10 illustrates an example of a computer that executes an analysis program. A computer 1000 includes, for example, a memory 1010 and a CPU 1020. In addition, the computer 1000 further includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program that defines each processing executed by the sensor 10 is implemented as the program module 1093 in which a code executable by the computer is written. The program module 1093 is stored in, for example, the hard disk drive 1090. For example, the program module 1093 for executing processing similar to that of the functional configuration in the sensor 10 is stored in the hard disk drive 1090. Note that the hard disk drive 1090 may be replaced with a solid state drive (SSD).

Data used in the processing of the above embodiments is stored in, for example, the memory 1010 or the hard disk drive 1090 as the program data 1094. In addition, the CPU 1020 reads the program module 1093 and the program data 1094 stored in the memory 1010 and the hard disk drive 1090 into the RAM 1012 as necessary, and executes the program module 1093.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

REFERENCE SIGNS LIST

10 Sensor
11 Communication unit
12 Storage unit
13 Control unit
131 Learning unit
132 Calculation unit
133 Classification unit
134 Detection unit
135 Feature amount extraction unit
136 Model reconstruction unit
137 Analysis unit
138 Analysis result output unit

The invention claimed is:

1. A traffic sensor comprising:
processing circuitry configured to:
calculate a degree of spread of a range of normal communication indicated by a normal communication model for each of the normal communication model for detecting abnormal communication of an Internet of Things (IoT) device learned for each of the IoT device to be monitored;
classify a normal communication model in which the degree of spread is less than a predetermined value as a normal communication model of an IoT device of a first model, and classify a normal communication model in which the degree of spread is equal to or greater than the predetermined value as a normal communication model of an IoT device of a second model;
detect abnormal communication in the IoT device by using the normal communication model of the IoT device of the first model;
extract a feature amount in which a contribution degree to detection of the abnormal communication is equal to or greater than a predetermined value among feature amounts used in the normal communication model of the IoT device of the first model;
reconstruct the normal communication model of the IoT device of the second model using the feature amount that has been extracted;
analyze abnormal communication common to each of IoT devices by using abnormal communication of the IoT device of the first model detected using the normal communication model and abnormal communication of the IoT device of the second model detected using the normal communication model that has been reconstructed; and
calculate the degree of spread of the range of the normal communication indicated by the normal communication model by a product of variances in feature amount directions used for the normal communication model.

2. The traffic sensor according to claim 1,
wherein the processing circuitry is further configured to output abnormal communication having a similarity equal to or greater than a predetermined value as a result of analysis of abnormal communication of each of the IoT devices.

3. The traffic sensor according to claim 1,
wherein the processing circuitry is further configured to, when a connection of a new IoT device is detected, learn a normal communication model of the IoT device based on communication data of the IoT device.

4. An analysis method performed by a traffic sensor, the analysis method comprising:
calculating a degree of spread of a range of normal communication indicated by a normal communication model for each of the normal communication model for detecting abnormal communication of an Internet of Things (IoT) device learned for each of the IoT device to be monitored;

classifying a normal communication model in which the degree of spread is less than a predetermined value as a normal communication model of an IoT device of a first model, and classifying a normal communication model in which the degree of spread is equal to or greater than the predetermined value as a normal communication model of an IoT device of a second model;

detecting abnormal communication in the IoT device by using the normal communication model of the IoT device of the first model;

extracting a feature amount in which a contribution degree to detection of the abnormal communication is equal to or greater than a predetermined value among feature amounts used in the normal communication model of the IoT device of the first model;

reconstructing the normal communication model of the IoT device of the second model using the feature amount that has been extracted;

analyzing abnormal communication common to each of IoT devices by using abnormal communication of the IoT device of the first model detected using the normal communication model and abnormal communication of the IoT device of the second model detected using the normal communication model that has been reconstructed; and calculating the degree of spread of the range of the normal communication indicated by the normal communication model by a product of variances in feature amount directions used for the normal communication model.

5. A non-transitory computer-readable recording medium storing therein an analysis program that causes a computer to execute a process comprising:

calculating a degree of spread of a range of normal communication indicated by a normal communication model for each of the normal communication model for detecting abnormal communication of an Internet of Things (IoT) device learned for each of the IoT device to be monitored;

classifying a normal communication model in which the degree of spread is less than a predetermined value as a normal communication model of an IoT device of a first model, and classifying a normal communication model in which the degree of spread is equal to or greater than the predetermined value as a normal communication model of an IoT device of a second model;

detecting abnormal communication in the IoT device by using the normal communication model of the IoT device of the first model;

extracting a feature amount in which a contribution degree to detection of the abnormal communication is equal to or greater than a predetermined value among feature amounts used in the normal communication model of the IoT device of the first model;

reconstructing the normal communication model of the IoT device of the second model using the feature amount that has been extracted;

analyzing abnormal communication common to each of IoT devices by using abnormal communication of the IoT device of the first model detected using the normal communication model and abnormal communication of the IoT device of the second model detected using the normal communication model that has been reconstructed; and calculating the degree of spread of the range of the normal communication indicated by the normal communication model by a product of variances in feature amount directions used for the normal communication model.

6. The analysis method according to claim 4, further comprising:

outputting abnormal communication having a similarity equal to or greater than a predetermined value as a result of analysis of abnormal communication of each of the IoT devices.

7. The analysis method according to claim 4, further comprising:

when a connection of a new IoT device is detected, learning a normal communication model of the IoT device based on communication data of the IoT device.

8. The non-transitory computer-readable recording medium according to claim 5, further comprising;

outputting abnormal communication having a similarity equal to or greater than a predetermined value as a result of analysis of abnormal communication of each of the IoT devices.

9. The non-transitory computer-readable recording medium according to claim 5, further comprising:

when a connection of a new IoT device is detected, learning a normal communication model of the IoT device based on communication data of the IoT device.

* * * * *